(12) United States Patent
Jung

(10) Patent No.: US 8,596,806 B2
(45) Date of Patent: Dec. 3, 2013

(54) BACKLIGHT UNIT AND DISPLAY APPARATUS USING THE SAME

(75) Inventor: Sang Hyeok Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 107 days.

(21) Appl. No.: 13/372,594

(22) Filed: Feb. 14, 2012

(65) Prior Publication Data

US 2013/0021780 A1    Jan. 24, 2013

(30) Foreign Application Priority Data

Jul. 22, 2011    (KR) .......................... 10-2011-0073046

(51) Int. Cl.
*G09F 13/04*    (2006.01)

(52) U.S. Cl.
USPC ........................................ 362/97.1; 362/97.3

(58) Field of Classification Search
USPC ........................................ 362/97.1, 97.3, 615
See application file for complete search history.

(56) References Cited

U.S. PATENT DOCUMENTS

| 8,109,644 B2 * | 2/2012 | Bierhuizen .................. 362/97.3 |
| 8,109,658 B2 * | 2/2012 | Matsuki et al. ........... 362/311.02 |
| 2013/0057779 A1 * | 3/2013 | Takata .......................... 348/790 |

* cited by examiner

*Primary Examiner* — Evan Dzierzynski

(74) *Attorney, Agent, or Firm* — Birch, Stewart, Kolasch & Birch, LLP

(57) ABSTRACT

A backlight unit and a display apparatus using the same are disclosed. The backlight unit includes a light guide plate having a first hollowness, a light source module disposed at the first hollowness, a bottom chassis having a second hollowness corresponding to the first hollowness, and an elastic member disposed at the second hollowness of the bottom chassis between the light source module and the bottom chassis.

20 Claims, 17 Drawing Sheets

BACKLIGHT UNIT AND DISPLAY APPARATUS USING THE SAME

CROSS REFERENCE TO RELATED APPLICATION

This application claims priority under 35 U.S.C. §119 to Korean Patent Application No. 10-2011-0073046, filed in Korea on Jul. 22, 2011, which is hereby incorporated in its entirety by reference as if fully set forth herein.

TECHNICAL FIELD

Embodiments relate to a backlight unit and a display apparatus using the same.

BACKGROUND

Generally, representative large-scale display apparatuses include liquid crystal displays (LCDs), plasma display panels (PDPs), etc.

Unlike self-emission type PDPs, LCDs essentially need a separate backlight unit due to absence of self light emitting devices.

Backlight units for use in LCDs are classified into edge type backlight units and direct type backlight units according to positions of light sources. In an edge type backlight unit, light sources are arranged at left and right edges or upper and lower edges of an LCD panel and a light guide plate is provided to uniformly distribute light throughout a surface of the LCD panel, which ensures uniform luminance and enables production of an extremely thin display panel.

A direct type backlight unit is generally applied to displays of 20 inches or more. The direct type backlight unit advantageously has greater light efficiency than the edge type backlight unit owing to a plurality of light sources being arranged below a panel and thus, is mainly used in a large-scale display requiring high luminance.

Conventional edge type or direct type backlight units adopt cold cathode fluorescent lamps (CCFLs) as a light source.

The backlight units using CCFLs, however, have several disadvantages, such as consumption of a great quantity of power because power should always be applied to a CCFL, low color reproduction efficiency of about 70% that of a cathode ray tube (CRT), and environmental pollution due to use of mercury.

Currently, backlight units using light emitting diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the national television system committee (NTSC) and can provide more vivid images to consumers.

SUMMARY

Embodiments provide a backlight unit including an elastic member disposed between a light source module and a bottom chassis to effectively dissipate heat generated from the light source module and a display apparatus using the same.

In one embodiment, a backlight unit includes a light guide plate having a first hollowness, a light source module disposed at the first hollowness, a bottom chassis having a second hollowness corresponding to the first hollowness, and an elastic member disposed at the second hollowness of the bottom chassis between the light source module and the bottom chassis.

The elastic member may have a height greater than or equal to that of the second hollowness.

The elastic member may have a width less than that of the second hollowness.

The elastic member may include a lower plate disposed on a bottom surface of the second hollowness, an upper plate disposed under the light source module, and a curved connection portion to interconnect corresponding ends of the lower plate and the upper plate.

The lower plate may have a different thickness than the upper plate, and the connection portion may be formed of a different material than the lower plate and the upper plate.

The second hollowness may have a width less than that of the light source module, and the second hollowness may have a width greater than that of the light source module.

The elastic member may include a heat sink disposed under the light source module and a metal elastic body disposed under the heat sink and on a bottom surface of the second hollowness.

The heat sink may have a width equal to that of the light source module, and the heat sink may have an upper surface disposed under the light source module and located outside the second hollowness.

The upper surface of the heat sink and a lower surface of the light source module may be planes or slopes which are in contact with each other. Alternatively, the upper surface of the heat sink and the lower surface of the light source module may be planes or slopes having uneven patterns, the planes or slopes being in contact with each other.

Also, the upper surface of the heat sink and the lower surface of the light source module may be planes or slopes, each of which has an uneven pattern formed at a portion thereof, the uneven patterns being disposed so as to correspond to a light source of the light source module.

The heat sink may be provided at a lower surface thereof with at least one third hollowness, and the metal elastic body may be in contact with a bottom surface of the third hollowness and the bottom surface of the second hollowness. The metal elastic body may be a spring.

The elastic member may include a thermally conductive non-foamed elastic body. The thermally conductive non-foamed elastic body may be silicone rubber containing thermally conductive powder or synthetic rubber containing thermally conductive powder.

The elastic member may include a thermally conductive non-foamed elastic adhesive formed at the bottom surface of the second hollowness and a thermally conductive non-foamed elastic body formed on the thermally conductive non-foamed elastic adhesive and disposed in the second hollowness.

Also, the elastic member may include a first thermally conductive non-foamed elastic adhesive formed at the bottom surface of the second hollowness, a thermally conductive non-foamed elastic body formed on the first thermally conductive non-foamed elastic adhesive and disposed in the second hollowness, a second thermally conductive non-foamed elastic adhesive formed on the thermally conductive non-foamed elastic body and disposed in the second hollowness, and a metal plate formed on the second thermally conductive non-foamed elastic adhesive and disposed outside the second hollowness.

The elastic member may further include a thermally conductive polymer film between the metal plate and the second thermally conductive non-foamed elastic adhesive and disposed in the second hollowness.

The light source module may include a board and at least one light source disposed on the board, the board protruding outside the first hollowness.

The light guide plate and the bottom chassis may be spaced apart from each other, and the first hollowness and the second hollowness may overlap.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being 'on' or 'under' another element, it can be directly on/under the element, and one or more intervening elements may also be present.

When an element is referred to as being 'on' or 'under', 'under the element' as well as 'on the element' can be included based on the element.

Figure 1:
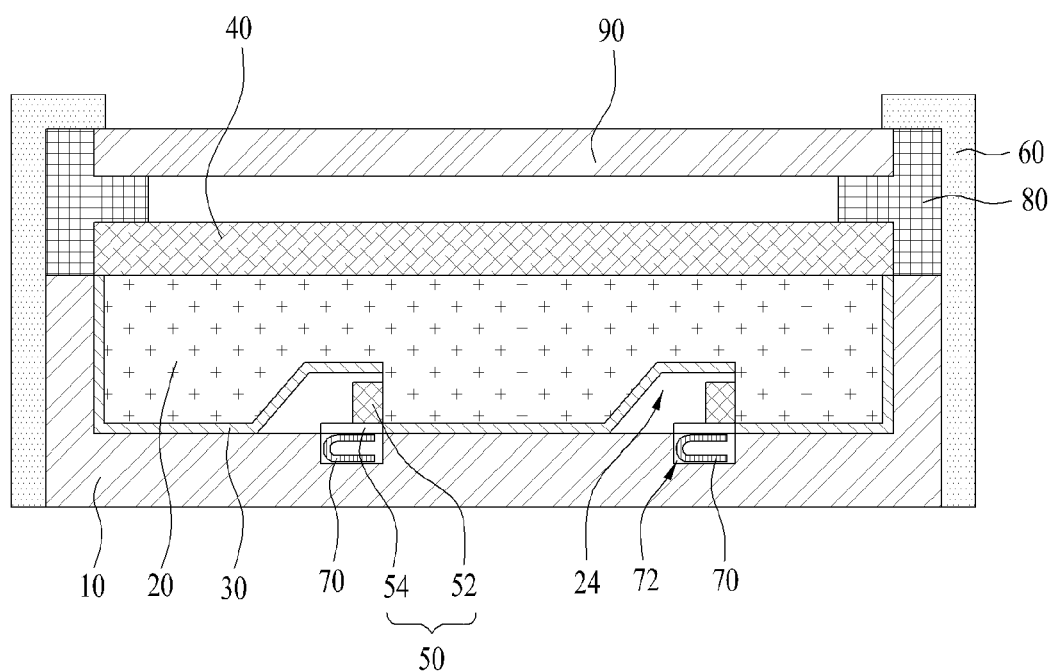
FIG. 1 is a sectional view showing a backlight unit according to an embodiment.

FIG. 1 is a sectional view showing a backlight unit according to an embodiment.

As shown in FIG. 1, the backlight unit may include a light guide plate 20 having a first hollowness 24, a reflector 30, an optical member 40, and a light source module 50.

The backlight unit may further include a top chassis 60, a bottom chassis 10 having a second hollowness 72, and a panel guide module 80.

The panel guide module 80 may support a display panel 90. The top chassis 60 may be connected to the panel guide module 80 and the bottom chassis 10.

At least one second hollowness 72 may be provided at the bottom chassis 10. The second hollowness 72 may be disposed so as to correspond to the first hollowness 24 of the light guide plate 20.

The second hollowness 72 may be formed in a polygonal shape in section, such as a triangular shape, a square shape, or a trapezoidal shape, or a hemispherical shape having a curved surface.

An elastic member 70 may be disposed in the second hollowness 72 of the bottom chassis 10. The elastic member 70 may be disposed between the light source module 50 and the bottom chassis 10. The elastic member 70 may be in contact with the light source module 50 and/or the bottom chassis 10.

The elastic member 70 may include a thermally conductive material to conduct heat generated from the light source module 50 so that the heat can be dissipated outward via the bottom chassis 10.

The height of the elastic member 70 may be greater than or equal to that of the second hollowness 72. The width of the elastic member 70 may be less than that of the second hollowness 72.

The elastic member 70 may be formed of a metal, such as silver (Ag), copper (Cu), gold (Au) or aluminum (Al), exhibiting high thermal conductivity.

The light guide plate 20 may be provided at the lower surface thereof with at least one first hollowness 24. The first hollowness 24 of the light guide plate 20 may be formed in a polygonal shape in section, such as a triangular shape, a square shape, or a trapezoidal shape.

According to circumstances, when the sectional shape of the hollowness 24 of the light guide plate 20 is a trapezoidal shape, a first lateral surface of the first hollowness 24 may be perpendicular to the bottom surface of the first hollowness 24, and a second lateral surface of the first hollowness 24 facing the first lateral surface of the first hollowness 24 may be sloped with respect to the bottom surface of the first hollowness 24.

On the other hand, when the sectional shape of the hollowness 24 of the light guide plate 20 is a trapezoidal shape, the first and second lateral surfaces of the first hollowness 24 may be sloped with respect to the bottom surface of the first hollowness 24, and a tilt angle between the first lateral surface and the bottom surface of the first hollowness 24 may be less than that between the second side and the bottom of the first hollowness 24.

According to circumstances, when the sectional shape of the hollowness 24 of the light guide plate 20 is a triangular shape, an angle between the first and second lateral surfaces of the first hollowness 24 may be about 30 to 120 degrees.

A ratio of the height of the first hollowness 24 of the light guide plate 20 to the total thickness of the light guide plate 20 may be about 0.3 to 0.7:1.

The light guide plate 20 may be formed of any one selected from among acryl resins, such as polymethylmethacrylate, polyethylene terephthalate (PET), cyclic olefin copolymers (COC), polyethylene naphthalate (PEN), polycarbonate (PC), polystyrene (PS), and methacrylate styrene (MS).

The light source module 50 may be disposed at the first hollowness 24 of the light guide plate 20.

The light source module 50 may include a board 54 and at least one light source 52 disposed on the board 54. Both the board 54 and the light source 52 may be disposed in the first hollowness 24 of the light guide plate 20.

According to circumstances, the board 54 may be disposed outside the first hollowness 24 of the light guide plate 20, and the light source 52 may be disposed inside the first hollowness 24 of the light guide plate 20.

The board 54 may have an electrode pattern for electric connection with the light source 52. The board 54 may be a printed circuit board (PCB) formed of polyethylene terephthalate (PET), glass, polycarbonate (PC), or silicon (Si) or may be configured in the form of a film.

Also, the board 54 may be selected from among a single-layer PCB, a multi-layer PCB, a ceramic board, a metal core PCB, etc.

At least one light source 52 may be disposed on the board 54. The light source 52 may be a side view type light emitting diode.

According to circumstances, the light source 52 may be a top view type light emitting diode.

The light source 52 may be a light emitting diode (LED) chip. The LED chip may be a blue LED chip or ultraviolet LED chip, or may be a package combining at least one or more selected from among a red LED chip, green LED chip, blue LED chip, yellow green LED chip, and white LED chip.

A white LED may be realized by coupling a yellow phosphor to a blue LED, coupling both red and green phosphors to a blue LED, or coupling yellow, red and green phosphors to a blue LED.

The reflector 30 may be disposed at the lower surface of the light guide plate 20.

That is, the reflector 30 may be disposed between the light guide plate 20 and the bottom chassis 10. The reflector 30 may extend from the bottom surface to the lateral surface of the light guide plate 20.

The reflector 30 is not formed under the board 54 of the light module 50. According to circumstances, however, the reflector 30 may be formed under the board 54 of the light module 50.

The reflector 30 may be disposed at the lateral surface and/or bottom surface of the first hollowness 24 of the light guide plate 20.

The reflector 30 may include a metal or metal oxide. For example, the reflector 30 may include a metal or metal oxide, such as aluminum (Al), silver (Ag), gold (Au) or titanium dioxide ($TiO_2$), exhibiting high reflectivity.

The optical member 40 may be disposed at the upper surface of the light guide plate 20.

The optical member 40 diffuses light emitted through the light guide plate 20. An uneven pattern may be formed at the upper surface of the optical member 40 to improve diffusion efficiency.

The optical member 40 may have several layers. The uneven pattern may be formed at the uppermost layer or another layer.

The optical member 600 may have several layers. An uneven pattern may be provided at the uppermost layer or another layer.

The uneven pattern may have stripe shapes arranged along the light source module 50.

The uneven pattern may have protrusion parts formed at the surface of the optical member 40. Each of the protrusion parts may have a first surface and second surface which face each other. An angle between the first surface and second surface may be an obtuse angle or an acute angle.

According to circumstances, the optical member 40 may include at least one sheet selected from among a diffusion sheet, prism sheet, luminance increasing sheet, etc.

The diffusion sheet may diffuse light emitted from the light source, the prism sheet may guide the diffused light to a light emission area, and the luminance increasing sheet may increase luminance.

Figure 2:
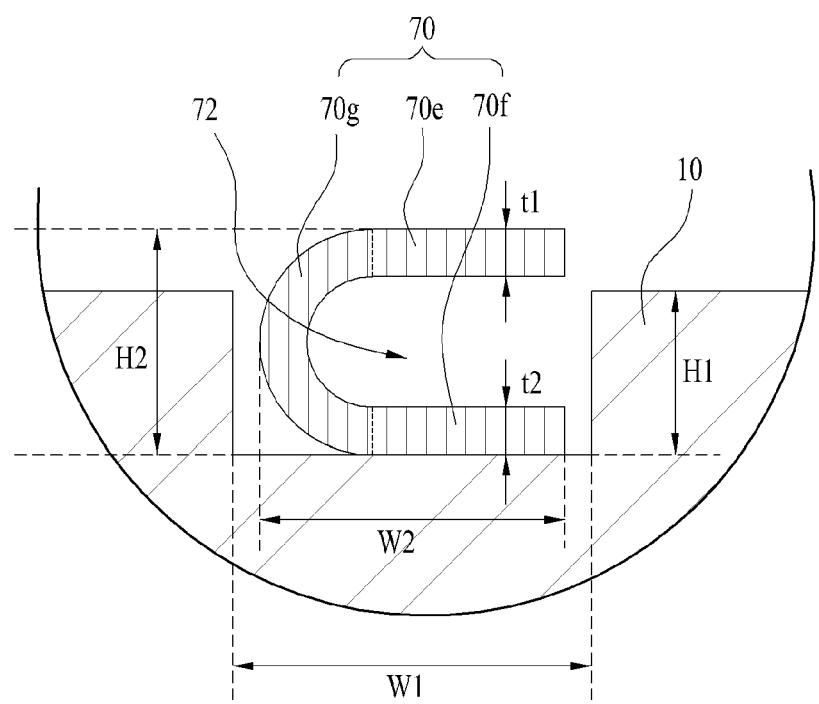
FIG. 2 is a sectional view showing an elastic member according to a first embodiment.

FIG. 2 is a sectional view showing an elastic member according to a first embodiment.

As shown in FIG. 2, the elastic member 70 may be disposed at the second hollowness 72 formed at the bottom chassis 10. The elastic member 70 may be formed in various shapes exhibiting elastic force, by which the elastic member 70 can be contracted by external force and restored when the external force is removed.

For example, the elastic member 70 may be formed in the shape of '⊏' having a lower plate 70*f*, an upper plate 70*e*, and a connection portion 70*g* connected between the lower plate 70*f* and the upper plate 70*e*.

The lower plate 70*f* may be disposed at the bottom surface of the second hollowness 72, and the upper plate 70*e* may be disposed under the light source module.

The connection portion 70*g* may interconnect corresponding ends of the lower plate 70*f* and the upper plate 70*e*. The connection portion 70*g* may be curved.

The curved connection portion 70*g* may restore the upper plate 70*e* when external force pushing the upper plate 70*e* is removed.

A thickness t2 of the lower plate 70*f* may be equal to a thickness t1 of the upper plate 70*e*. According to circumstances, however, the thicknesses of the lower plate 70*f* and the upper plate 70*e* may be different.

For example, the thickness t1 of the upper plate 70*e* may be greater than the thickness t2 of the lower plate 70*f*.

This is because the upper plate 70*e* is in direct contact with the light source module, thereby rapidly dissipating a large amount of heat.

The elastic member 70 may include a thermally conductive material to conduct heat generated from the light source module 50 so that the heat can be dissipated outward via the bottom chassis.

For example, the elastic member 70 may be formed of a metal, such as silver (Ag), copper (Cu), gold (Au) or aluminum (Al), exhibiting high thermal conductivity.

According to circumstances, the connection portion 70*g* of the elastic member 70 may be formed of a different material than the lower plate 70*f* and the upper plate 70*e*.

The reason for this is that the lower plate 70*f* and the upper plate 70*e* may be formed of a metal exhibiting high thermal conductivity, but the connection portion 70*g* may be formed of a metal or metal alloy exhibiting high elasticity as well as high thermal conductivity.

Also, a height H2 of the elastic member 70 may be greater than a height H1 of the second hollowness 72.

According to circumstances, the height H2 of the elastic member 70 may be equal to the height H1 of the second hollowness 72.

A width W2 of the elastic member 70 may be less than a width W1 of the second hollowness 72. According to circumstances, the width W2 of the elastic member 70 may be equal to the width W1 of the second hollowness 72.

Figure 3A:
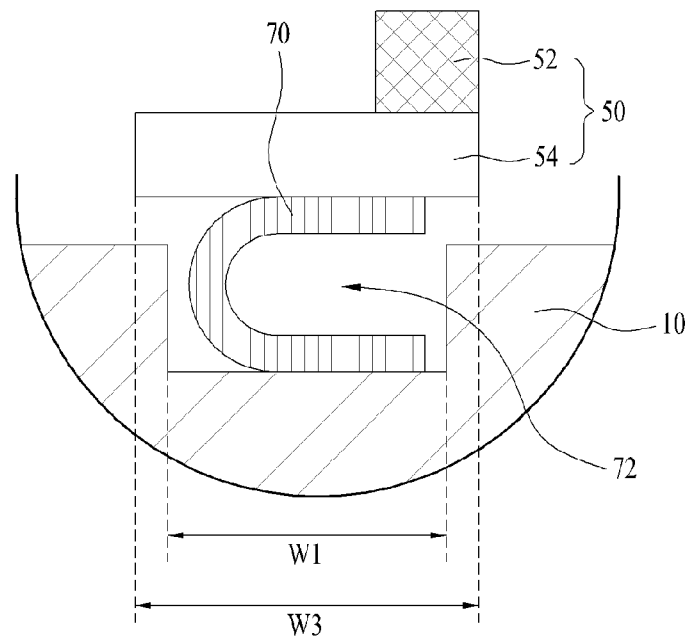
FIGS. 3A and 3B are sectional views showing a light source module in contact with the elastic member.
Figure 3B:
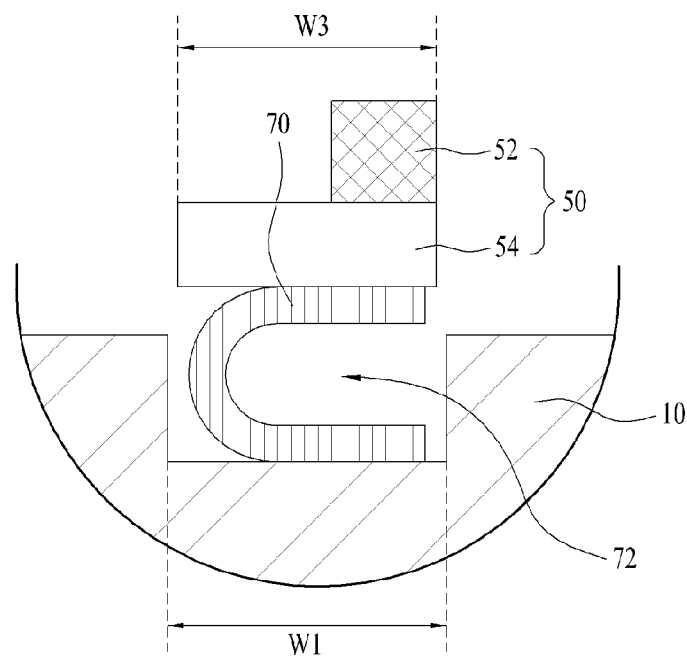

FIGS. 3A and 3B are sectional views showing the light source module in contact with the elastic member.

As shown in FIG. 3A, the second hollowness 72 may be formed at the bottom chassis 10, and the elastic member 70 may be disposed at the second hollowness 72.

The light source module 50 may include a board 54 and at least one light source 52 arranged on the board 54. The board 54 of the light source module 50 may be disposed on the upper surface of the elastic member 70. According to circumstances, the board 54 may be disposed in contact with the upper surface of the elastic member 70.

The lower surface of the elastic member 70 may be disposed on the bottom chassis 10, which is the bottom surface of the second hollowness 72. The upper surface of the elastic member 70 may be disposed under the lower surface of the board 54 of the light source module 50.

The width W1 of the second hollowness 72 may be less than a width W3 of the board 54 of the light source module 50.

In this case, the light source module 50 may apply force toward the second hollowness 72 of the bottom chassis 10 due to thermal expansion of the light guide plate. As a result, the elastic member 70 may be contracted, and therefore, the lower surface of the board 54 of the light source module 50 may contact the surface of the bottom chassis 10.

Consequently, heat generated from the light source 52 of the light source module 50 may be dissipated outward via the board 54, the elastic member 70, and the bottom chassis 10, or directly transmitted to the board 54 and the bottom chassis 10.

As shown in FIG. 3B, the lower surface of the elastic member 70 may be disposed on or in contact with the bottom chassis 10, which is the bottom surface of the second hollowness 72, and the upper surface of the elastic member 70 may be disposed under or in contact with the lower surface of the board 54 of the light source module 50.

The width W1 of the second hollowness 72 may be greater than the width W3 of the board 54 of the light source module 50.

In this case, the light source module 50 may apply force toward the second hollowness 72 of the bottom chassis 10 due to thermal expansion of the light guide plate. As a result, the elastic member 70 may be contracted, and therefore, the lateral surface of the board 54 of the light source module 50 may contact the lateral surface of the bottom chassis 10.

Consequently, heat generated from the light source 52 of the light source module 50 may be dissipated outward via the board 54, the elastic member 70, and the bottom chassis 10, or directly transmitted to the board 54 and the bottom chassis 10.

Figure 4:
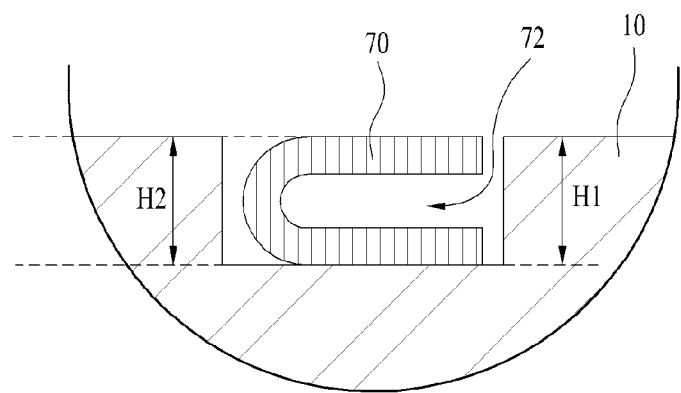
FIG. 4 is a view showing an embodiment in which the height of an elastic member is equal to that of a second hollowness.
Figure 5:
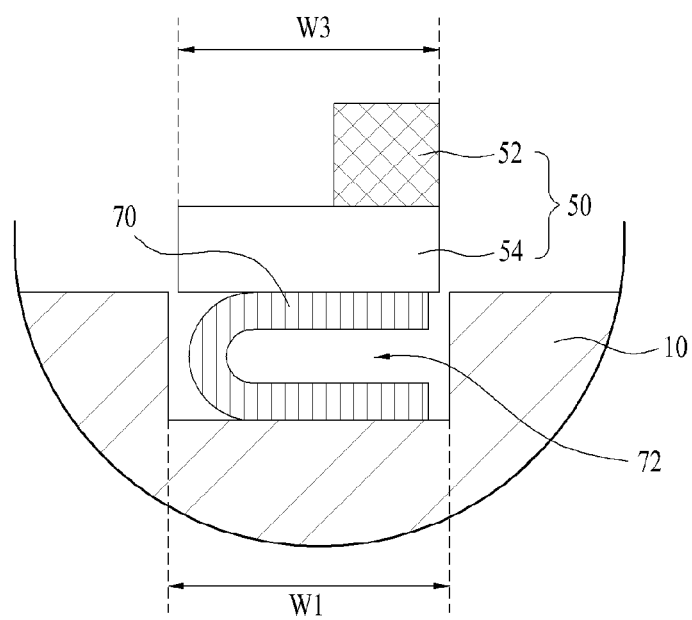
FIG. 5 is a view showing a light source module in contact with the elastic member of FIG. 4.

FIG. 4 is a view showing an embodiment in which the height of an elastic member is equal to that of a second hollowness, and FIG. 5 is a view showing a light source module in contact with the elastic member of FIG. 4.

As shown in FIG. 4, the height H2 of the elastic member 70 may be equal to the height H1 of the second hollowness 72 formed at the bottom chassis 10.

According to circumstances, the height H2 of the elastic member 70 may be less than the height H1 of the second hollowness 72.

When the height H2 of the elastic member 70 is equal to or less than the height H1 of the second hollowness 72, the width W3 of the board 54 of the light source module 50 may be less than the width W1 of the second hollowness 72.

That is, as shown in FIG. 5, the lower surface of the elastic member 70 may be disposed on or in contact with the bottom chassis 10, which is the bottom surface of the second hollowness 72, and the upper surface of the elastic member 70 may be disposed under or in contact with the lower surface of the board 54 of the light source module 50.

The width W1 of the second hollowness 72 may be greater than the width W3 of the board 54 of the light source module 50.

In this case, the light source module 50 may apply force toward the second hollowness 72 of the bottom chassis 10 due to thermal expansion of the light guide plate. As a result, the elastic member 70 may be contracted, and therefore, the lateral surface of the board 54 of the light source module 50 may contact the lateral surface of the bottom chassis 10.

Consequently, heat generated from the light source 52 of the light source module 50 may be dissipated outward via the board 54, the elastic member 70, and the bottom chassis 10, or directly transmitted to the board 54 and the bottom chassis 10.

Figure 6:
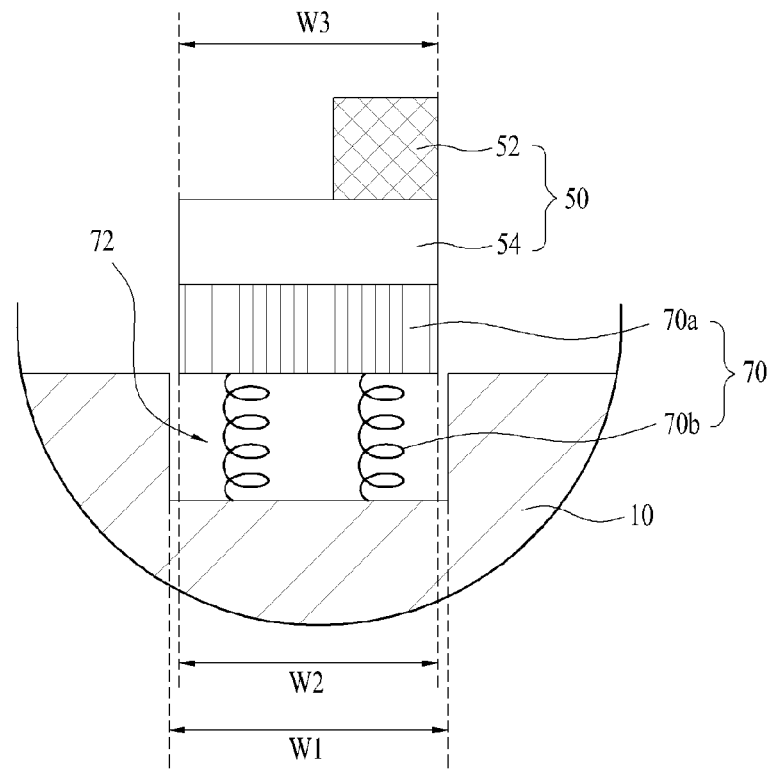
FIG. 6 is a sectional view showing an elastic member according to a second embodiment.

FIG. 6 is a sectional view showing an elastic member according to a second embodiment.

As shown in FIG. 6, the elastic member 70 may be disposed at the second hollowness 72 formed at the bottom chassis 10. The elastic member 70 may be formed in various shapes exhibiting elastic force, by which the elastic member 70 can be contracted by external force and restored when the external force is removed.

For example, the elastic member 70 may include a heat sink 70*a*, and a metal elastic body 70*b*.

The heat sink 70*a* may be disposed under or in contact with the light source module 50, and the metal elastic body 70*b* disposed under the heat sink 70*a* and on the bottom surface of the second hollowness 72 or in contact with the heat sink 70*a* and the bottom surface of the second hollowness 72.

That is, the upper surface of the heat sink 70*a* of the elastic member 70 may be disposed under or in contact with the lower surface of the board 54 of the light source module 50, and the lower surface of the heat sink 70*a* may be in contact with the metal elastic body 70*b*.

A width W2 of the heat sink 70*a* of the elastic member 70 may be equal to the width W3 of the board 54 of the light source module 50 or less than the width W1 of the second hollowness 72 of the bottom chassis 10.

The upper surface of the heat sink 70*a* may be disposed under or in contact with the board 54 of the light source module 50 so that the upper surface of the heat sink 70*a* can be located outside the second hollowness 72.

The metal elastic body 70*b* may be in contact with the heat sink 70*a* and the bottom chassis 10 so that the metal elastic body 70*b* can be located in the second hollowness 72.

The heat sink 70*a* and the metal elastic body 70*b* may be formed of a metal, such as Ag, Cu, Au or Al, exhibiting high thermal conductivity.

According to circumstances, the metal elastic body 70*b* may be formed to have a structure, such as a spring, exhibiting high elasticity, and may be formed of a different material than the heat sink 70*a*.

The reason for this is that the heat sink 70*a* may be formed of a metal exhibiting high thermal conductivity, but the metal elastic body 70*b* may be formed of a metal or metal alloy exhibiting high elasticity as well as high thermal conductivity.

In this case, the light source module 50 may apply force toward the second hollowness 72 of the bottom chassis 10 due to thermal expansion of the light guide plate. As a result, the elastic member 70 may be contracted, and therefore, the lateral surface of the board 54 of the light source module 50 may contact the lateral surface of the bottom chassis 10.

Consequently, heat generated from the light source 52 of the light source module 50 may be dissipated outward via the board 54, the elastic member 70, and the bottom chassis 10, or directly transmitted to the board 54 and the bottom chassis 10.

Figure 7:
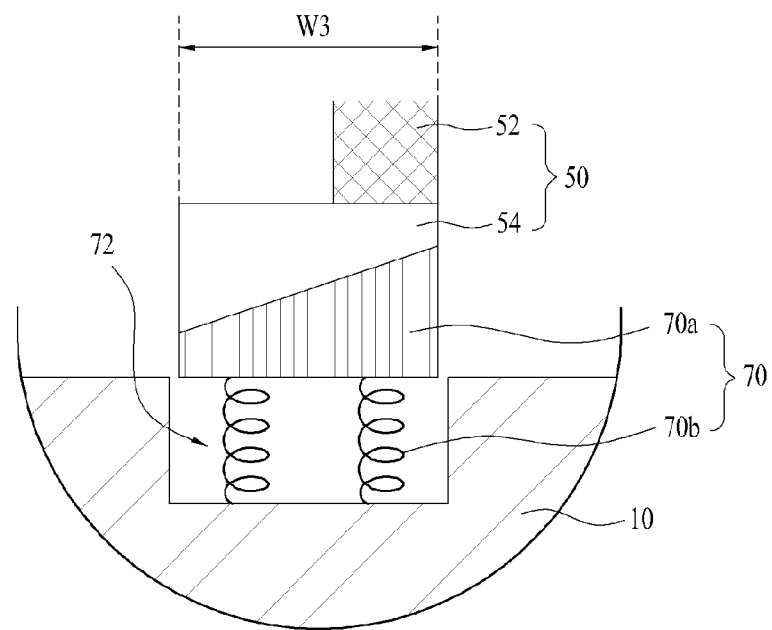
FIG. 7 is a sectional view showing an elastic member having a slope.

FIG. 7 is a sectional view showing an elastic member having a slope.

As shown in FIG. 7, the elastic member 70 may be disposed at the second hollowness 72 formed at the bottom chassis 10. The elastic member 70 may include a heat sink 70*a* and a metal elastic body 70*b*.

The upper surface of the heat sink 70*a* of the elastic member 70 may be disposed under or in contact with the lower surface of the board 54 of the light source module 50, and the lower surface of the heat sink 70a may be in contact with the metal elastic body 70b.

The upper surface of the heat sink 70a and the lower surface of the board 54 of the light source module 50 may be sloped and in contact.

That is, the thickness of the heat sink 70a may increase toward the light source 52, and thickness of the board 54 may decrease toward the light source 52.

The reason that the upper surface of the heat sink 70a and the lower surface of the board 54 of the light source module 50 are slopped is that the contact area between the heat sink 70a and the light source module 50 is increased, thereby improving heat dissipation efficiency.

Also, since the temperature of a region adjacent to the light source 52 is highest, heat dissipation efficiency is improved when the thickness of the board 54 at the region adjacent to the light source 52 is decreased and the thickness of the heat sink 70a at the region adjacent to the light source 52 is increased.

Figure 8A:
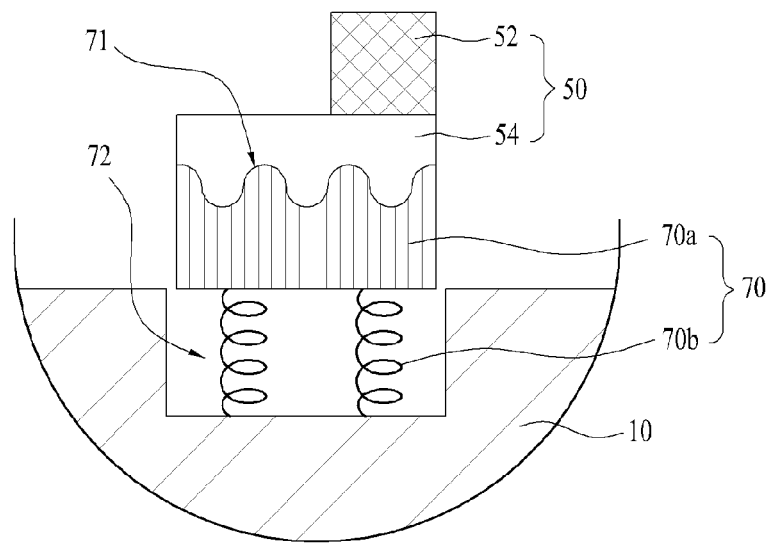
FIGS. 8A and 8B are sectional views showing an elastic member having an uneven pattern.
Figure 8B:
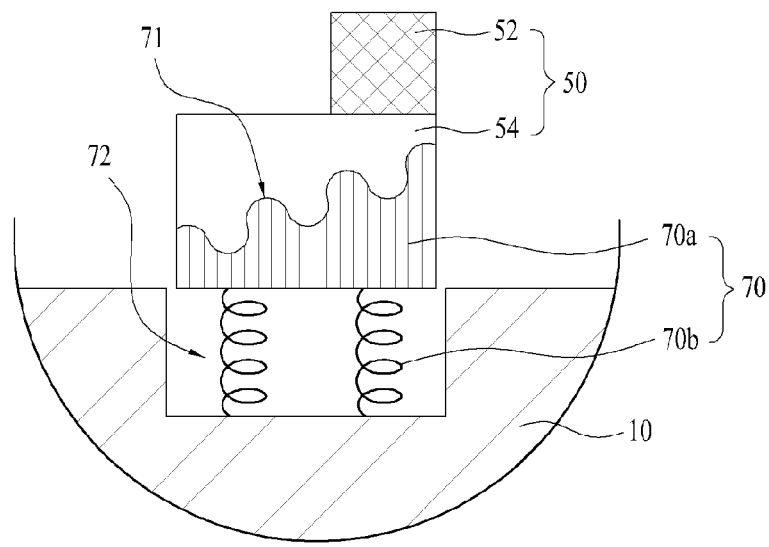

FIGS. 8A and 8B are sectional views showing an elastic member having an uneven pattern.

As shown in FIG. 8A, the elastic member 70 may be disposed at the second hollowness 72 formed at the bottom chassis 10. The elastic member 70 may include a heat sink 70a and a metal elastic body 70b.

The upper surface of the heat sink 70a of the elastic member 70 may be disposed under or in contact with the lower surface of the board 54 of the light source module 50, and the lower surface of the heat sink 70a may be in contact with the metal elastic body 70b.

The upper surface of the heat sink 70a and the lower surface of the board 54 of the light source module 50 may be planes having uneven patterns 71 and in contact.

The reason that the uneven patterns 71 are formed at the upper surface of the heat sink 70a and the lower surface of the board 54 of the light source module 50 are sloped is that the contact area between the heat sink 70a and the light source module 50 is increased, thereby improving heat dissipation efficiency.

Also, as shown in FIG. 8B, the upper surface of the heat sink 70a and the lower surface of the board 54 of the light source module 50 may be slopped while having uneven patterns 71 and in contact.

When the upper surface of the heat sink 70a and the lower surface of the board 54 of the light source module 50 are sloped while having the uneven patterns 71, the contact area between the heat sink 70a and the light source module 50 is further increased than the embodiment of FIG. 8A, thereby further improving heat dissipation efficiency.

Also, since the temperature of a region adjacent to the light source 52 is highest, heat dissipation efficiency is improved when the thickness of the board 54 at the region adjacent to the light source 52 is decreased and the thickness of the heat sink 70a at the region adjacent to the light source 52 is increased.

Figure 9A:
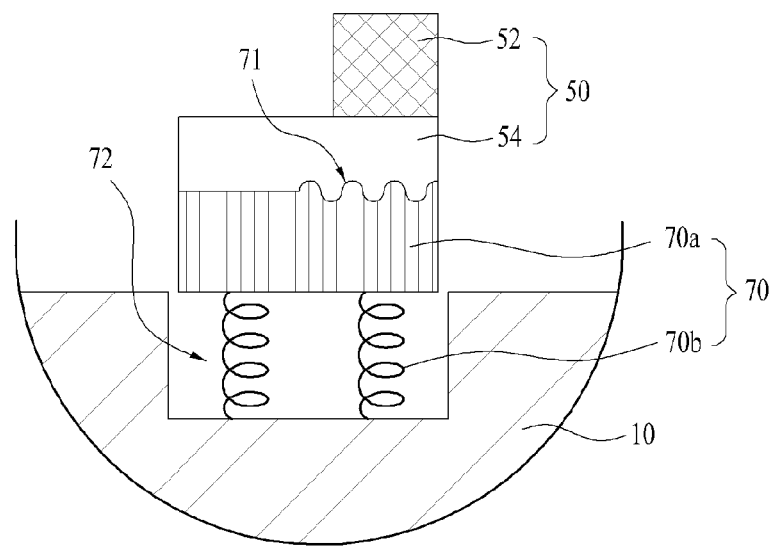
FIGS. 9A and 9B are sectional views showing an elastic member having an uneven pattern formed at a portion thereof.
Figure 9B:
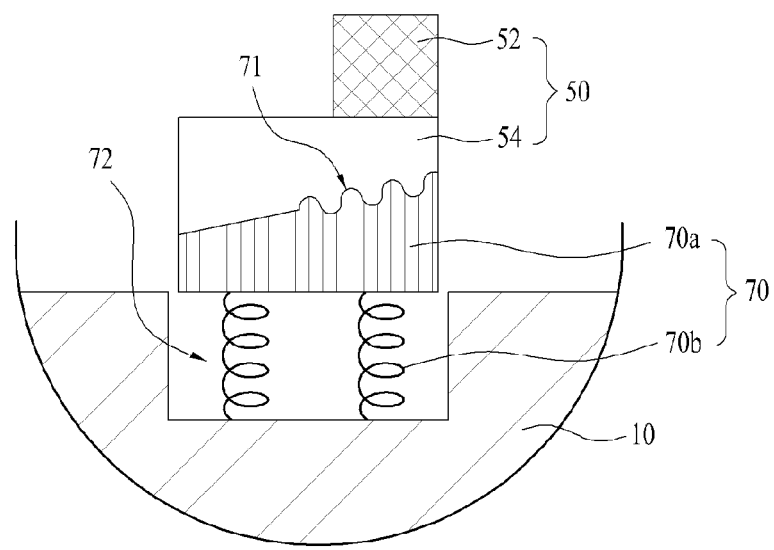

FIGS. 9A and 9B are sectional views showing an elastic member having an uneven pattern formed at a portion thereof.

As shown in FIG. 9A, the elastic member 70 may be disposed at the second hollowness 72 formed at the bottom chassis 10. The elastic member 70 may include a heat sink 70a and a metal elastic body 70b.

The upper surface of the heat sink 70a of the elastic member 70 may be disposed under or in contact with the lower surface of the board 54 of the light source module 50, and the lower surface of the heat sink 70a may be in contact with the metal elastic body 70b.

The upper surface of the heat sink 70a may be a plane having an uneven pattern 71 formed at a portion thereof, and the lower surface of the board 54 of the light source module 50 may be a plane having an uneven pattern 71 formed at a portion thereof.

The uneven pattern 71 formed at a portion of the upper surface of the heat sink 70a and the uneven pattern 71 formed at a portion of the lower surface of the board 54 of the light source module 50 may be in contact while facing each other.

That is, the uneven patterns 71 may be formed at a region of the lower surface of the board 54 adjacent to the light source 52 and at a region of the upper surface of the heat sink 70a adjacent to the light source 52.

According to circumstances, the uneven patterns 71 may be located so as to correspond to the light source 52.

The reason for this is that the temperature of a region adjacent to the light source 52 is highest, and therefore, the contact area between the board 54 and the heat sink 70a is increased, whereby heat is effectively dissipated.

Also, as shown in FIG. 9B, the upper surface of the heat sink 70a may be a slope having an uneven pattern 71 formed at a portion thereof, and the lower surface of the board 54 of the light source module 50 may be a slope having an uneven pattern 71 formed at a portion thereof.

That is, the uneven patterns 71 may be formed at a region of the lower surface of the board 54 adjacent to the light source 52 and at a region of the upper surface of the heat sink 70a adjacent to the light source 52.

When the upper surface of the heat sink 70a and the lower surface of the board 54 of the light source module 50 are sloped while having the uneven patterns 71 formed at the regions adjacent to the light source 52, it may be possible to more effectively dissipate heat than in the embodiment of FIG. 9A.

Figure 10:
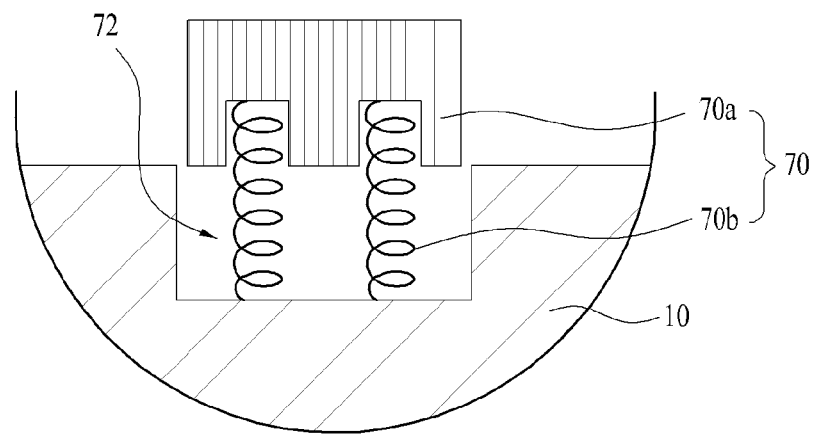
FIG. 10 is a sectional view showing an elastic member having a hollowness.

FIG. 10 is a sectional view showing an elastic member having a hollowness.

As shown in FIG. 10, the elastic member 70 may be disposed at the second hollowness 72 formed at the bottom chassis 10. The elastic member 70 may include a heat sink 70a and a metal elastic body 70b.

The heat sink 70a of the elastic member 70 may be provided at the lower surface thereof with at least one third hollowness.

The third hollowness of the heat sink 70a may be disposed so as to correspond to the metal elastic body 70b.

Consequently, the upper surface of the heat sink 70a of the elastic member 70 may be disposed under or in contact with the lower surface of the board 54 of the light source module 50, and the third hollowness of the lower surface of the heat sink 70a may be in contact with the metal elastic body 70b.

In this case, a portion of the metal elastic body 70b may be located outside the second hollowness 72 of the bottom chassis 10.

When the metal elastic body 70b is located in the third hollowness of the heat sink 70a, the elastic member 70 may have a stable structure, thereby improving reliability.

FIGS. 11 to 14 are sectional views showing an elastic member according to a third embodiment.

Figure 11:
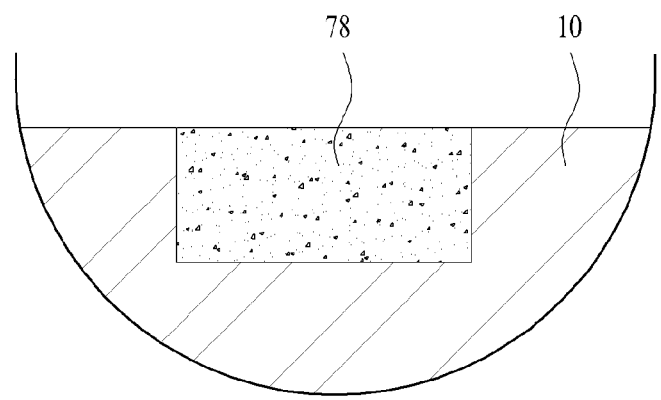
FIGS. 11 to 14 are sectional views showing an elastic member according to a third embodiment.

As shown in FIG. 11, the elastic member may be disposed at the second hollowness formed at the bottom chassis 10. The elastic member may be formed in various shapes exhibiting elastic force, by which the elastic member 70 can be contracted by external force and restored when the external force is removed.

For example, the elastic member may include a nonfoamed elastic body 78.

The non-foamed elastic body 78 may be formed of silicone rubber containing thermally conductive powder or synthetic rubber containing thermally conductive powder.

The thermally conductive non-foamed elastic body 78 may be formed of a non-foamed elastic material having no pores formed therein. The non-foamed elastic material may contain thermally conductive powder.

The thermally conductive powder may be silver (Ag), copper (Cu), gold (Au) or aluminum (Al), exhibiting high thermal conductivity.

That is, the thermally conductive non-foamed elastic body 78 may be manufactured by mixing liquid silicone rubber or synthetic rubber with thermally conductive powder and thermally curing the mixture.

The manufactured thermally conductive non-foamed elastic body 78 may be in contact with the board of the light source module to transmit heat generated from the light source module to the bottom chassis 10, thereby efficiently dissipating heat.

Also, the thermally conductive non-foamed elastic body may exhibit elastic force, by which the thermally conductive non-foamed elastic body 78 can be contracted by external force and restored when the external force is removed, and therefore, the thermally conductive non-foamed elastic body 78 may remain in contact with the light source module irrespective of thermal expansion and contraction of the light guide plate.

Figure 12:
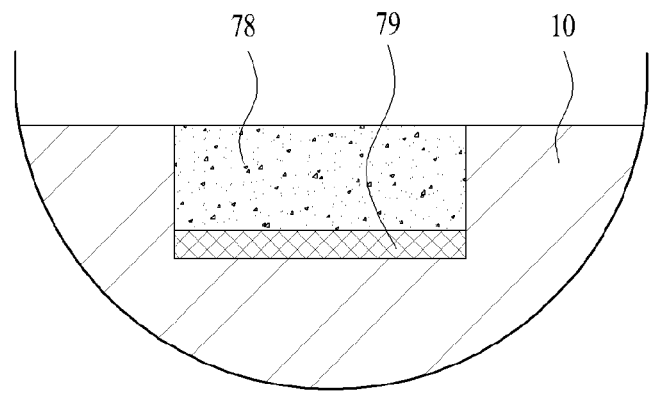

Also, as shown in FIG. 12, the elastic member may further include a thermally conductive non-foamed elastic adhesive 79 between the thermally conductive non-foamed elastic body 78 and the second hollowness of the bottom chassis 10.

That is, the elastic member may include a thermally conductive non-foamed elastic body 78 and a thermally conductive non-foamed elastic adhesive 79.

The thermally conductive non-foamed elastic adhesive 79 may be formed at the bottom surface of the second hollowness, and the thermally conductive non-foamed elastic body 78 may be formed on the thermally conductive non-foamed elastic adhesive 79.

The thermally conductive non-foamed elastic body 78 may be disposed in the second hollowness of the bottom chassis 10.

The thermally conductive non-foamed elastic adhesive 79 is obtained by injecting a paste mixture of liquid silicone rubber or synthetic rubber with thermally conductive powder into the second hollowness and thermally curing the mixture.

The obtained thermally conductive non-foamed elastic adhesive 79 may maintain contact between the thermally conductive non-foamed elastic body 78 and the bottom chassis 10, thereby improving reliability.

Also, the thermally conductive non-foamed elastic adhesive 79 may exhibit high thermal conductivity, and therefore, the thermally conductive non-foamed elastic adhesive 79 may transmit heat, generated from the light source module, transmitted from the thermally conductive non-foamed elastic body 78 to the bottom chassis 10, thereby efficiently dissipating heat.

Figure 13:
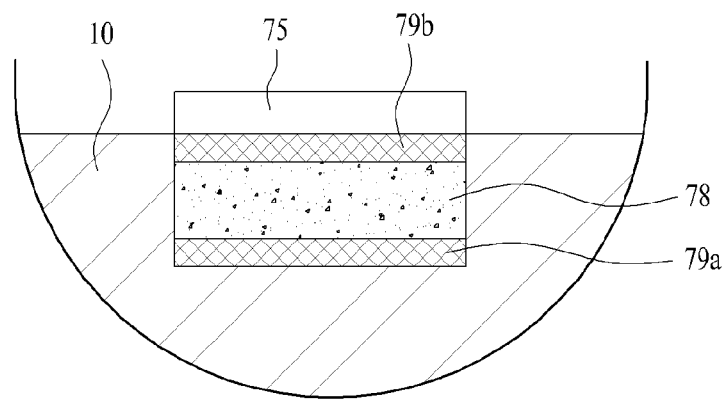

Also, as shown in FIG. 13, the elastic member may be disposed at the second hollowness formed at the bottom chassis 10. The elastic member may include a first thermally conductive non-foamed elastic adhesive 79*a*, a thermally conductive non-foamed elastic body 78, a second thermally conductive non-foamed elastic adhesive 79*b*, and a metal plate 75.

The first thermally conductive non-foamed elastic adhesive 79*a* may be formed at the bottom surface of the second hollowness, the thermally conductive non-foamed elastic body 78 may be formed on the first thermally conductive non-foamed elastic adhesive 79*a*, the second thermally conductive non-foamed elastic adhesive 79*b* may be formed on the thermally conductive non-foamed elastic body 78, and the metal plate 75 may be formed on the second thermally conductive non-foamed elastic adhesive 79*b*.

The first thermally conductive non-foamed elastic adhesive 79*a*, the thermally conductive non-foamed elastic body 78, and the second thermally conductive non-foamed elastic adhesive 79*h* may be disposed inside the second hollowness of the bottom chassis 10, and the metal plate 75 may be disposed outside the second hollowness of the bottom chassis 10.

The embodiment of FIG. 13 may be achieved by adding the metal plate 75 to the embodiment of FIG. 12. When the light source module contacts the metal plate 75 but does not directly contact the thermally conductive non-foamed elastic body 78, heat dissipation efficiency may be further improved.

In the embodiment of FIG. 13, therefore, heat dissipation efficiency may be improved using the metal plate 75, and elasticity may be improved using the thermally conductive non-foamed elastic body 78.

The metal plate 75 may be formed of a metal, such as silver (Ag), copper (Cu), gold (Au) or aluminum (Al), exhibiting high thermal conductivity.

The first thermally conductive non-foamed elastic adhesive 79*a* may strengthen contact between the thermally conductive non-foamed elastic body 78 and the bottom chassis 10, and the second thermally conductive non-foamed elastic adhesive 79*b* may strengthen contact between the metal plate 75 and the thermally conductive non-foamed elastic body 78, thereby improving reliability.

Figure 14:
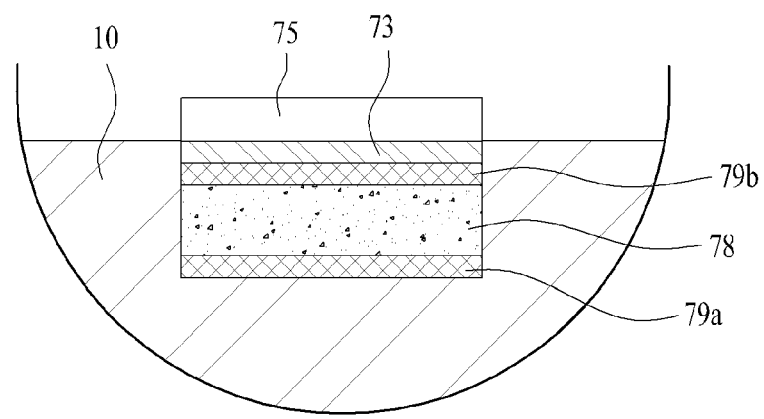

Also, as shown in FIG. 14, the elastic member may further include a thermally conductive polymer film 73 between the second thermally conductive non-foamed elastic adhesive 79*b* and the metal plate 75.

That is, the embodiment of FIG. 14 may be achieved by adding the thermally conductive polymer film 73 to the embodiment of FIG. 13.

The thermally conductive polymer film 73 may be disposed between the metal plate 75 and the second thermally conductive non-foamed elastic adhesive 79*b* in the second hollowness of the bottom chassis 10.

If heat is directly transmitted to the second thermally conductive non-foamed elastic adhesive 79*b* via the metal plate 75, the second thermally conductive non-foamed elastic adhesive 79*b* may melt and leak out of the bottom chassis 10 with the result that a short circuit with the light source module may occur. The thermally conductive polymer film 73 may be provided to solve the aforementioned problem.

Consequently, the thermally conductive polymer film 73 may be added to manufacture a more structurally stable elastic member.

The thermally conductive polymer film 73 may be formed of polyimide.

Figure 15:
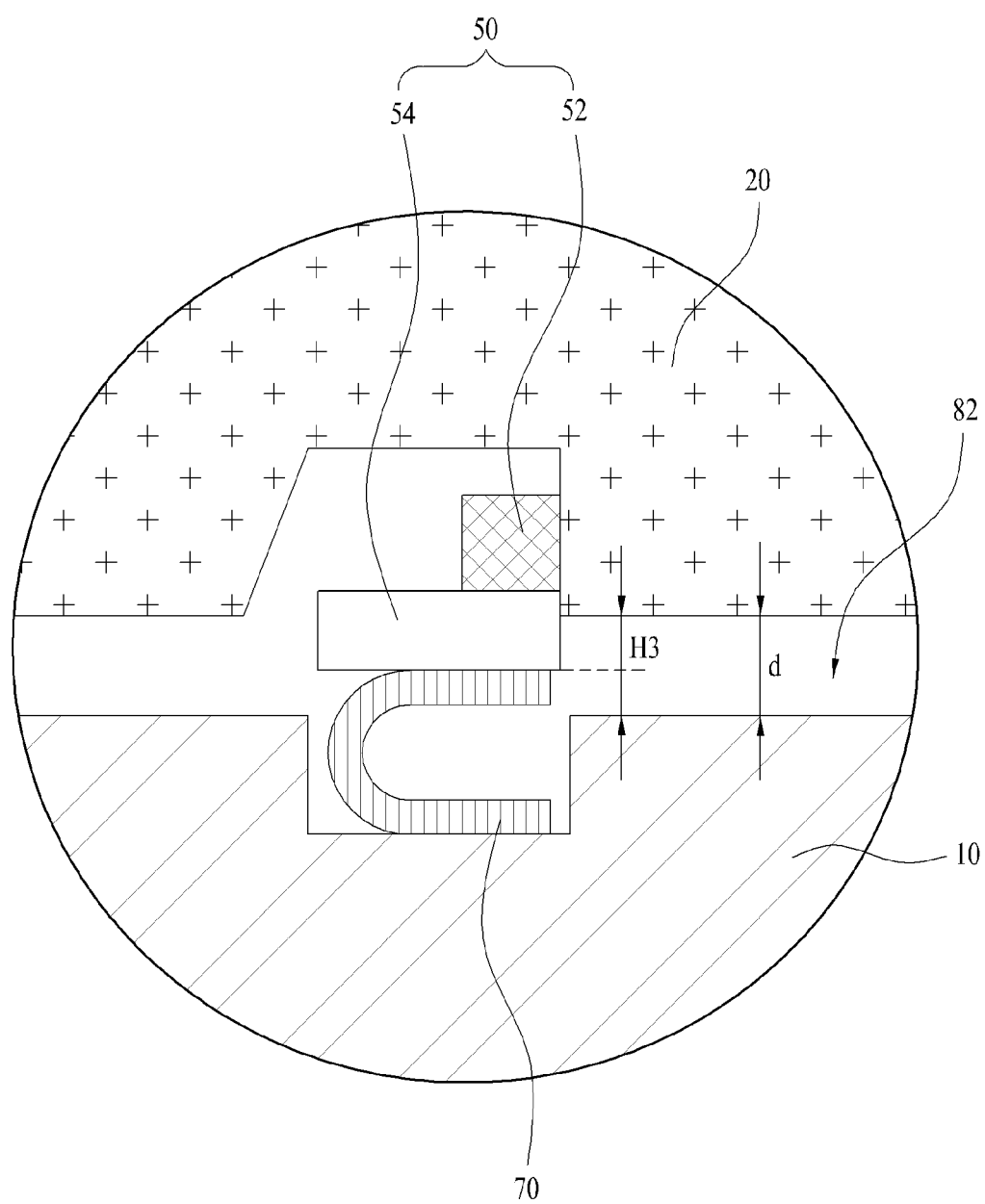
FIG. 15 is a sectional view showing a gap between a light guide plate and a bottom chassis.

FIG. 15 is a sectional view showing a gap between the light guide plate and the bottom chassis.

As shown in FIG. 15, the first hollowness of the light guide plate 20 and the second hollowness of the bottom chassis 10 may be disposed so as to face each other. The light source module 50 may be disposed at the first hollowness of the light guide plate 20, and the elastic member 70 may be disposed at the second hollowness of the bottom chassis 10.

The board 54 of the light source module 50 may be partially or entirely exposed outside the first hollowness of the light guide plate 20, and the light source 52 of the light source module 50 may be disposed in the first hollowness of the light guide plate 20.

That is, the board 54 of the light source module 50 may protrude from the lower surface of the light guide plate 20 by a height H3.

The board 54 of the light source module 50 is exposed outside the first hollowness so as to maintain contact with the elastic member 70.

For this reason, the light guide plate 20 and the bottom chassis 10 may be spaced from each other by a predetermined gap d.

The first hollowness of the light guide plate 20 and the second hollowness of the bottom chassis 10 may overlap.

Figure 16A:
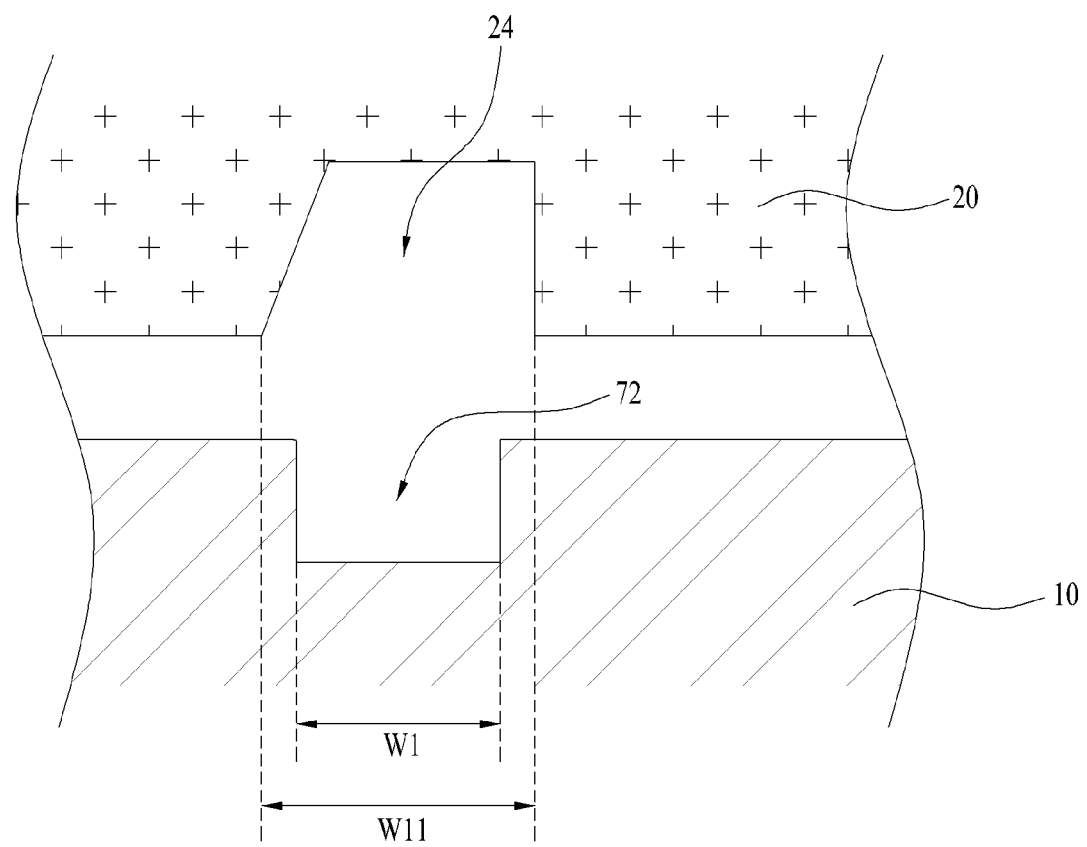
FIGS. 16A to 16C are views illustrating a positional relationship between a first hollowness of the light guide plate and a second hollowness of the bottom chassis.
Figure 16B:
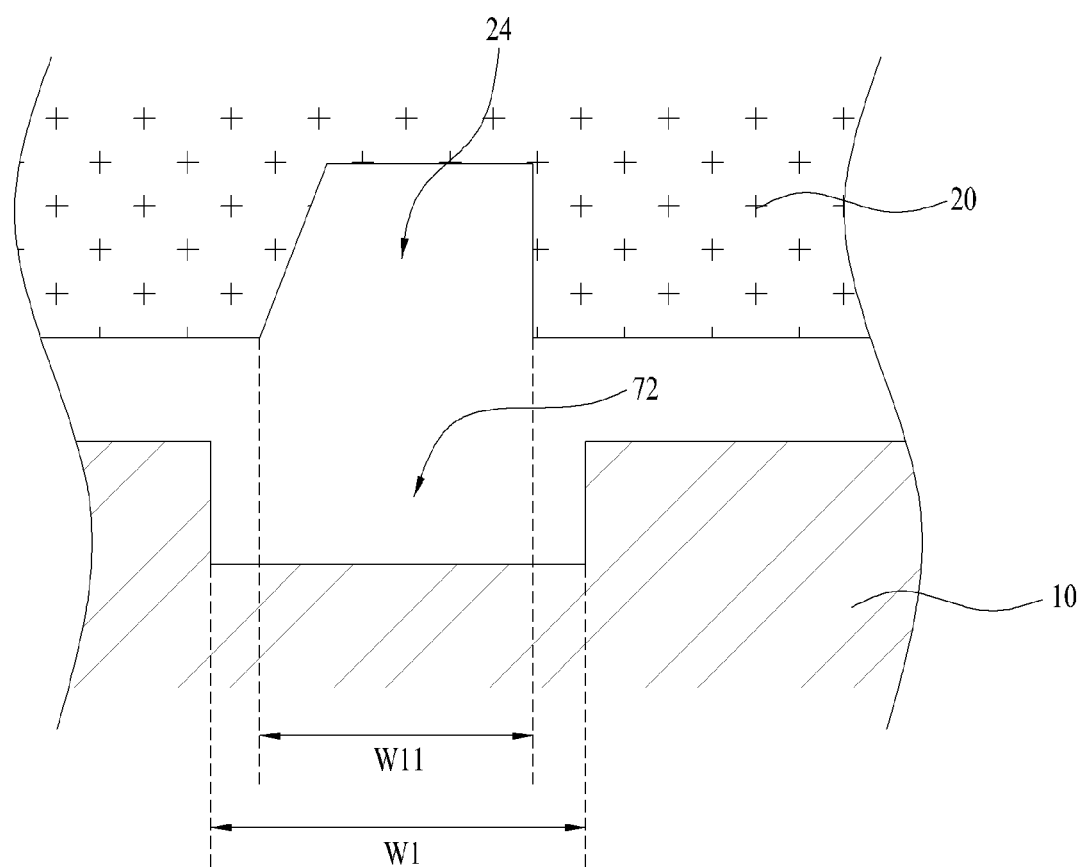
Figure 16C:
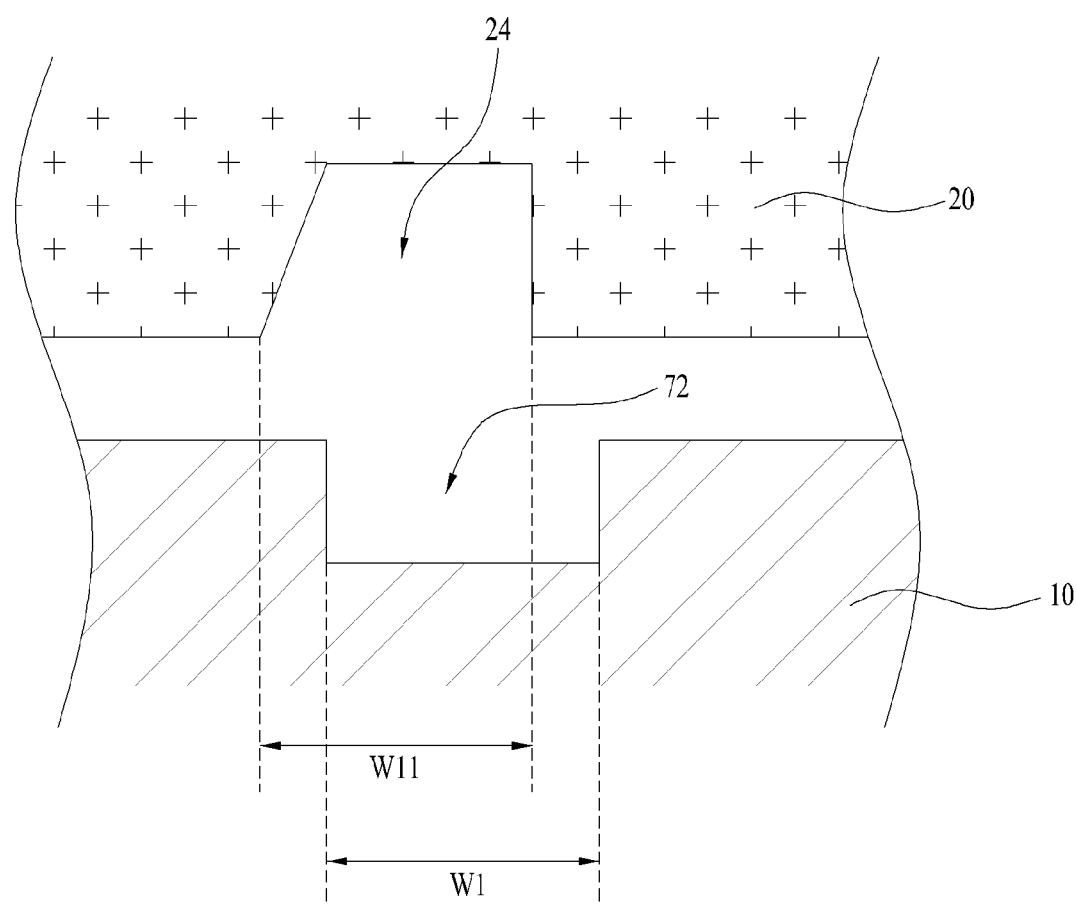

FIGS. 16A to 16C are views illustrating a positional relationship between the first hollowness of the light guide plate and the second hollowness of the bottom chassis.

First, as shown in FIG. 16A, the first hollowness 24 of the light guide plate 20 and the second hollowness 72 of the bottom chassis 10 may overlap.

A width W11 of the first hollowness 24 of the light guide plate 20 may be greater than the width W1 of the second hollowness 72 of the bottom chassis 10.

Consequently, the first hollowness 24 of the light guide plate 20 may fully cover the second hollowness 72 of the bottom chassis 10.

Also, as shown in FIG. 16B, the first hollowness 24 of the light guide plate 20 and the second hollowness 72 of the bottom chassis 10 may overlap. The width W11 of the first hollowness 24 of the light guide plate 20 may be less than the width W1 of the second hollowness 72 of the bottom chassis 10.

Consequently, the first hollowness 24 of the light guide plate 20 may partially cover the second hollowness 72 of the bottom chassis 10 while the first hollowness 24 of the light guide plate 20 and the second hollowness 72 of the bottom chassis 10 may fully overlap.

Also, as shown in FIG. 16C, the first hollowness 24 of the light guide plate 20 and the second hollowness 72 of the bottom chassis 10 may partially overlap.

The width W11 of the first hollowness 24 of the light guide plate 20 may be equal to the width W1 of the second hollowness 72 of the bottom chassis 10.

According to circumstances, the width W11 of the first hollowness 24 of the light guide plate 20 may be greater than or less than the width W1 of the second hollowness 72 of the bottom chassis 10.

Consequently, the first hollowness 24 of the light guide plate 20 may partially cover the second hollowness 72 of the bottom chassis 10 while the first hollowness 24 of the light guide plate 20 and the second hollowness 72 of the bottom chassis 10 may partially overlap.

In the aforementioned embodiments, the elastic member may be disposed between the light source module and the bottom chassis to eliminate poor contact between the light source module and the bottom chassis due to thermal expansion and contraction of the light guide plate, thereby achieving stable and effective heat dissipation.

Consequently, reliability of the backlight unit may be improved.

Figure 17:
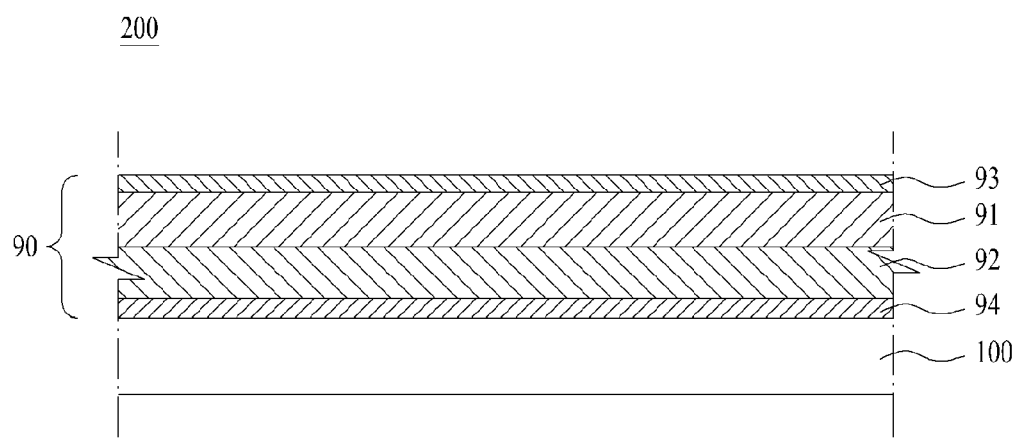
FIG. 17 is a view showing a display module having a backlight unit according to an embodiment.

FIG. 17 is a view showing a display module having a backlight unit according to an embodiment.

As shown in FIG. 17, the display module 200 may include a display panel 90 and a backlight unit 100.

The display panel 90 may include a color filter substrate 91 and a thin film transistor (TFT) substrate 92, which are bonded to face each other with a uniform cell gap therebetween. A liquid crystal layer (not shown) may be disposed between the two substrates 91 and 92.

The color filter substrate 91 may include a plurality of pixels, each of which may include red (R), green (G) and blue (B) sub-pixels. When light is applied to the color filter substrate 91, the color filter substrate 91 may generate an image corresponding to the red, green or blue.

Each of the pixels may include red, green and blue sub-pixels. Alternatively, each of the pixels may include red, green, blue and white (W) sub-pixels, without being limited thereto.

The TFT substrate 92 may be a device having switching devices to switch pixel electrodes (not shown).

For example, common electrodes and the pixel electrodes may change arrangement of molecules of the liquid crystal layer according to predetermined voltage applied from the outside.

The liquid crystal layer may include a plurality of liquid crystal molecules. The arrangement of the liquid crystal molecules may be changed in correspondence to voltage difference generated between the pixel electrodes and the common electrodes.

Consequently, light emitted from the backlight unit 100 may be incident upon the color filter substrate 91 in correspondence to change in arrangement of the molecules of the liquid crystal layer.

An upper polarizing plate 93 and a lower polarizing plate 94 may be disposed respectively on and under the display panel 90. More specifically, the upper polarizing plate 93 may be disposed at the upper surface of the color filter substrate 91 and the lower polarizing plate 94 may be disposed at the lower surface of the TFT substrate 92.

Although not shown, gate and data drive units to generate drive signals to drive the display panel 90 may be provided at the lateral surface of the display panel 90.

As shown in FIG. 17, the display module 200 may be configured by disposing the backlight unit 100 at the display panel 90 in tight contact.

For example, the backlight unit 100 may be fixedly bonded to the lower surface of the display panel 90, more specifically the lower polarizing plate 94. To this end, a bonding layer (not shown) may be provided between the lower polarizing plate 94 and the backlight unit 100.

When the backlight unit 100 is disposed at the display panel 90 in tight contact, the total thickness of the display apparatus may be reduced, thereby providing aesthetically pleasing appearance. In addition, an additional structure to fix the backlight unit 100 may not be needed, thereby simplifying the structure and manufacturing process of the display apparatus.

Also, the space between the backlight unit 100 and the display panel 90 may be removed, thereby preventing malfunction of the display apparatus or reduction in quality of a displayed image due to penetration of foreign matter into the space.

Figure 18:
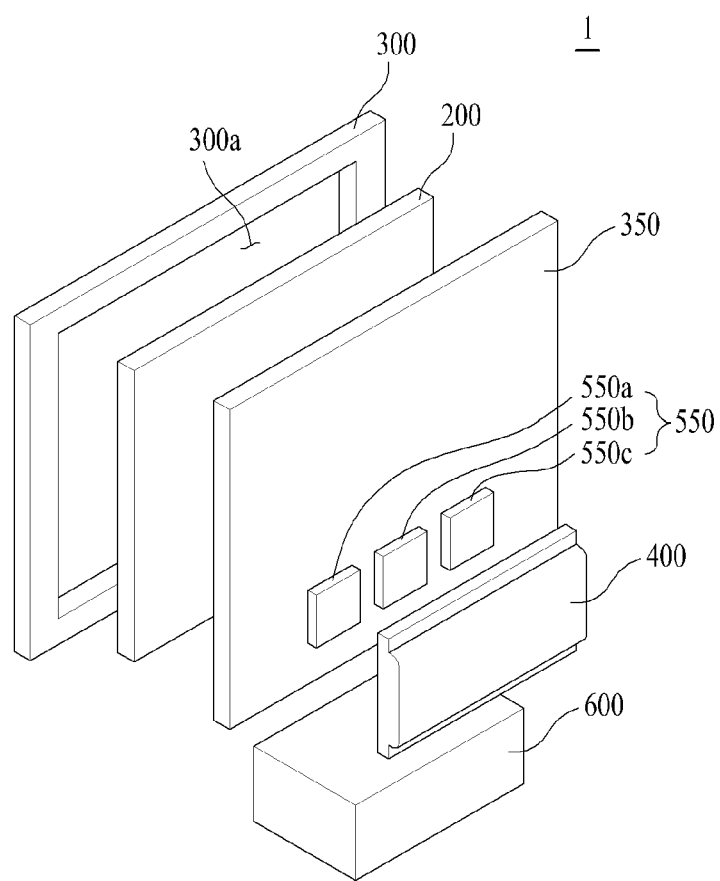
FIGS. 18 and 19 are views showing a display apparatus according to an embodiment.
Figure 19:
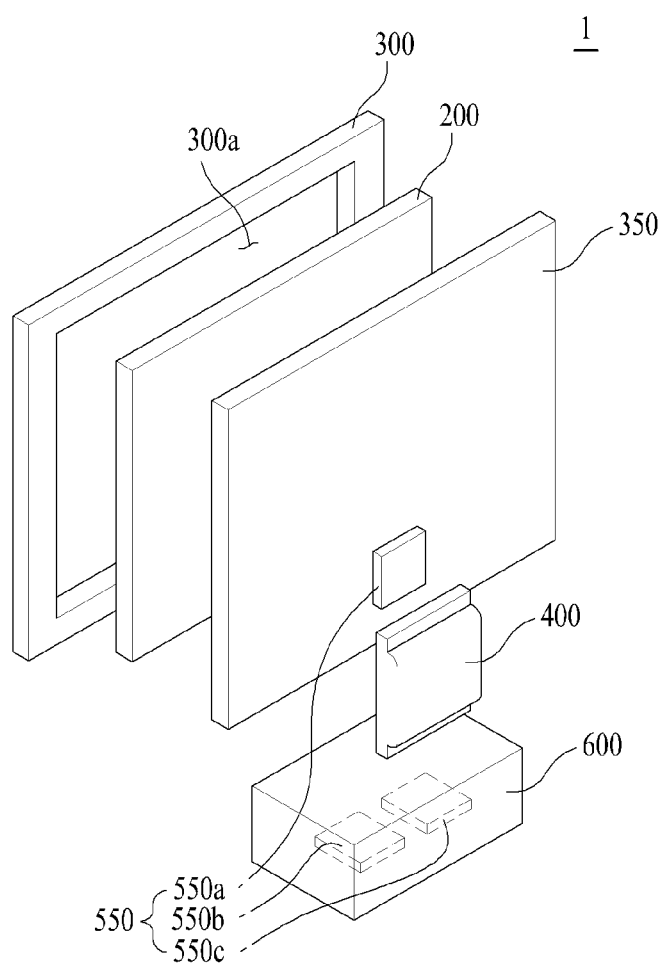

FIGS. 18 and 19 are views showing a display apparatus according to an embodiment.

First, as shown in FIG. 18, the display apparatus 1 may include a display module 200, a front cover 300 and back cover 350 to cover the display module 200, a drive unit 550 provided at the back cover 350, and a drive unit cover 40 to cover the drive unit 550.

The front cover 300 may include a transparent front panel (not shown) to ensure transmission of light. The front panel may protect the display module 200 spaced apart therefrom by a predetermined gap and transmit light emitted from the display module 200 so that an image displayed on the display module 200 can be seen from the outside.

Also, the front cover 300 may be formed of a flat sheet having no window 300*a*. In this case, the front cover 300 may be formed of a transparent material transmitting light, for example injection-molded plastic.

When the front cover 300 is formed of a flat sheet, a frame may be removed from the front cover 300

The back cover 350 may be coupled to the front cover 300 so as to protect the display module 200.

The drive unit 550 may be disposed on a surface of the back cover 350.

The drive unit 550 may include a drive controller 550*a*, a main board 550*b* and a power supply board 550*c*.

The drive controller 550*a* may be a timing controller. The drive controller 550*a* may adjust operation timing of each driver IC of the display module 200. The main board 550*b* may transmit V-sync, H-sync and R, G and B resolution signals to the timing controller. The power supply board 550*c* may supply power to the display module 200.

The drive unit 550 may be provided at the back cover 350 and covered by the drive unit cover 400.

The back cover 350 may have a plurality of holes, through which the display module 200 may be connected to the drive unit 550. Also, a stand 600 to support the display apparatus 1 may be provided at the back cover 350.

Also, as shown in FIG. 19, the drive controller 550*a* of the drive unit 550 may be provided at the back cover 350, and the main board 550*b* and the power supply board 550*c* may be provided in the stand 600.

The drive unit cover 400 may cover only the drive unit 550 provided at the back cover 350.

In this embodiment, the main board 550*b* and the power supply board 550*c* are provided separately. Alternatively, the main board 55*b* and the power supply board 55*c* may be integrated, without being limited thereto.

Another embodiment may be realized as a display apparatus, indication apparatus and lighting system including the elastic member, the light guide plate having the hollowness, and the light source module included in the aforementioned embodiments. For example, the lighting system may include a lamp and streetlight.

The lighting system may be used as a lighting apparatus which condenses light emitted from a plurality of LEDs. In particular, the light system may be used as a downlight embedded in the ceiling or wall of a building so that the opening side of a shade is exposed.

In the aforementioned embodiments, the elastic member may be disposed between the light source module and the bottom chassis to eliminate poor contact between the light source module and the bottom chassis due to thermal expansion and contraction of the light guide plate, thereby achieving stable and effective heat dissipation.

Consequently, reliability of the backlight unit may be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a light guide plate having a first hollowness;
   a light source module disposed at the first hollowness;
   a bottom chassis having a second hollowness corresponding to the first hollowness; and
   an elastic member disposed at the second hollowness of the bottom chassis between the light source module and the bottom chassis.

2. The backlight unit according to claim 1, wherein the elastic member has a height greater than or equal to a height of the second hollowness.

3. The backlight unit according to claim 1, wherein the elastic member comprises:
   a lower plate disposed on a bottom surface of the second hollowness;
   an upper plate disposed under the light source module; and
   a curved connection portion to interconnect corresponding ends of the lower plate and the upper plate.

4. The backlight unit according to claim 3, wherein the lower plate has a different thickness than the upper plate.

5. The backlight unit according to claim 3, wherein the connection portion is formed of a different material than the lower plate and the upper plate.

6. The backlight unit according to claim 1, wherein the second hollowness has a width less than a width of the light source module.

7. The backlight unit according to claim 1, wherein the second hollowness has a width greater than a width of the light source module.

8. The backlight unit according to claim 1, wherein the elastic member comprises:
   a heat sink disposed under the light source module; and
   a metal elastic body disposed under the heat sink and on a bottom surface of the second hollowness.

9. The backlight unit according to claim 8, wherein the heat sink has an upper surface disposed under the light source module and located outside the second hollowness.

10. The backlight unit according to claim 8, wherein the upper surface of the heat sink and a lower surface of the light source module are planes or slopes which are in contact with each other.

11. The backlight unit according to claim 8, wherein the upper surface of the heat sink and a lower surface of the light source module are planes or slopes having uneven patterns, the planes or slopes being in contact with each other.

12. The backlight unit according to claim 8, wherein the upper surface of the heat sink and a lower surface of the light source module are planes or slopes, each of which has an uneven pattern formed at a portion thereof, the uneven patterns being disposed so as to correspond to a light source of the light source module.

13. The backlight unit according to claim 8, wherein the heat sink is provided at a lower surface thereof with at least one third hollowness, and the metal elastic body is in contact with a bottom surface of the third hollowness and the bottom surface of the second hollowness.

14. The backlight unit according to claim 1, wherein the elastic member comprises a thermally conductive non-foamed elastic body.

15. The backlight unit according to claim 1, wherein the elastic member comprises:
   a thermally conductive non-foamed elastic adhesive disposed at a bottom surface of the second hollowness; and
   a thermally conductive non-foamed elastic body disposed on the thermally conductive non-foamed elastic adhesive and disposed in the second hollowness.

16. The backlight unit according to claim 1, wherein the elastic member comprises:
- a first thermally conductive non-foamed elastic adhesive disposed at a bottom surface of the second hollowness;
- a thermally conductive non-foamed elastic body disposed on the first thermally conductive non-foamed elastic adhesive and disposed in the second hollowness;
- a second thermally conductive non-foamed elastic adhesive disposed on the thermally conductive non-foamed elastic body and disposed in the second hollowness; and
- a metal plate disposed on the second thermally conductive non-foamed elastic adhesive and disposed outside the second hollowness.

17. The backlight unit according to claim 16, wherein the elastic member further comprises a thermally conductive polymer film between the metal plate and the second thermally conductive non-foamed elastic adhesive and disposed in the second hollowness.

18. The backlight unit according to claim 1, wherein the light source module comprises a board and at least one light source disposed on the board, the board protruding outside the first hollowness.

19. The backlight unit according to claim 1, wherein the light guide plate and the bottom chassis are spaced apart from each other, and the first hollowness and the second hollowness overlap.

20. A display apparatus comprising:
- a display panel; and
- a backlight unit to irradiate light to the display panel, wherein the backlight unit comprises:
- a light guide plate having a first hollowness;
- a light source module disposed at the first hollowness;
- a bottom chassis having a second hollowness corresponding to the first hollowness; and
- an elastic member disposed at the second hollowness of the bottom chassis between the light source module and the bottom chassis.

* * * * *